US012627413B2

(12) United States Patent
Niu et al.

(10) Patent No.: US 12,627,413 B2
(45) Date of Patent: May 12, 2026

(54) HARQ-ACK CODEBOOK HANDLING

(71) Applicant: Apple Inc., Cupertino, CA (US)

(72) Inventors: Huaning Niu, San Jose, CA (US);
Chunxuan Ye, San Jose, CA (US);
Dawei Zhang, Saratoga, CA (US); Wei Zeng, Saratoga, CA (US); Weidong Yang, San Diego, CA (US); Hong He, San Diego, CA (US); Sigen Ye, San Diego, CA (US); Chunhai Yao, Beijing (CN); Oghenekome Oteri, San Diego, CA (US); Haitong Sun, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 18/261,339

(22) PCT Filed: May 31, 2021

(86) PCT No.: PCT/CN2021/097405
§ 371 (c)(1),
(2) Date: Jul. 13, 2023

(87) PCT Pub. No.: WO2022/151636
PCT Pub. Date: Jul. 21, 2022

(65) Prior Publication Data
US 2024/0072939 A1    Feb. 29, 2024

(30) Foreign Application Priority Data
Jan. 15, 2021    (WO) ................ PCT/CN2021/072072

(51) Int. Cl.
*H04L 1/1812*    (2023.01)
*H04W 72/11*    (2023.01)
(Continued)

(52) U.S. Cl.
CPC ........... *H04L 1/1812* (2013.01); *H04W 72/11* (2023.01); *H04W 72/1273* (2013.01); *H04W 72/232* (2023.01)

(58) Field of Classification Search
CPC .... H04L 1/1812; H04L 5/0055; H04W 72/11; H04W 72/1273; H04W 72/232
(Continued)

(56) References Cited

U.S. PATENT DOCUMENTS

2020/0106586 A1    4/2020    Nemeth et al.
2020/0396760 A1*   12/2020   Yi ......................... H04W 72/23
(Continued)

FOREIGN PATENT DOCUMENTS

CN    109639398    4/2019

OTHER PUBLICATIONS

CATT, "HARQ operation enhancement for NTN", 3GPP TSG RAN WG1 #103-e, R1-2007856, Nov. 13, 2020, 7 sheets.
(Continued)

*Primary Examiner* — Obaidul Huq
(74) *Attorney, Agent, or Firm* — Fay Kaplun & Marcin, LLP

(57) ABSTRACT

Embodiments of the present disclosure relate to methods, devices and computer readable storage media for hybrid automatic repeat request acknowledgement (HARQ-ACK) codebook handling. In example embodiments, a method is provided. The method comprises determining, at a terminal device, respective hybrid automatic repeat request (HARQ) feedback configurations of a plurality of HARQ processes, wherein each HARQ feedback configuration indicates whether HARQ feedback is enabled or disabled for a corresponding HARQ process; and generating a HARQ-ACK codebook for Physical Downlink Shared Channel (PDSCH) based on the HARQ feedback configurations of the plurality of HARQ processes; and transmitting the HARQ-ACK codebook to a network device.

20 Claims, 14 Drawing Sheets

(51) Int. Cl.
      *H04W 72/1273*       (2023.01)
      *H04W 72/232*        (2023.01)

(58) Field of Classification Search
      USPC .......................................... 370/310, 328, 329
      See application file for complete search history.

(56)                          References Cited

U.S. PATENT DOCUMENTS

| | | | | |
|---|---|---|---|---|
| 2021/0099257 A1* | 4/2021 | Joseph | .................. | H04W 76/27 |
| 2022/0201724 A1* | 6/2022 | Zhang | ................... | H04W 72/20 |
| 2022/0385411 A1* | 12/2022 | Lei | ......................... | H04L 1/1614 |
| 2023/0094711 A1* | 3/2023 | Wu | ....................... | H04L 1/1887 |
| | | | | 370/329 |
| 2023/0231665 A1* | 7/2023 | Wu | ....................... | H04L 1/1854 |
| | | | | 370/329 |
| 2023/0291504 A1* | 9/2023 | Cheng | .................. | H04L 1/1896 |
| 2024/0048292 A1* | 2/2024 | Wang | ................... | H04L 1/1854 |

OTHER PUBLICATIONS

Ericsson, "On HARQ enhancements for NTN", 3GPP TSG-RAN WG1 Meeting #102-e, R1-2006465, Aug. 28, 2020, 9 sheets.
Qualcomm Incorporated, "Enhancements on HARQ for NTN", 3GPP TSG RAN WG1 #103-e, R1-2009264, Nov. 13, 2020, 6 sheets.

* cited by examiner

200

NETWORK DEVICE
110

TERMINAL DEVICE
120

210 TRANSMISSION OF
SPS CONFIGURATION

220 DETERMINATION OF
HARQ FEEDBACK
CONFIGURATIONS FOR
HARQ PROCESSES

230 DETERMINATION
OF HARQ FEEDBACK
CONFIGURATIONS FOR
HARQ PROCESSES

240 SPS PDSCH TRANSMISSION

250 GENERATION OF
HARQ-ACK CODEBOOK
FOR SPS PDSCH

260 HARQ-ACK CODEBOOK TRANSMISSION

400

NETWORK DEVICE
110

TERMINAL DEVICE
120

410 PDSCH TRANSMISSIONS WITH
CORRESPONDING DCI TRIGGERING
TYPE-3 HARQ-ACK FEEDBACK

420 GENERATION OF
TYPE-3 HARQ-ACK
CODEBOOK FOR PDSCH

430 HARQ-ACK CODEBOOK TRANSMISSION

500

510

DETERMINE RESPECTIVE HARQ FEEDBACK
CONFIGURATIONS OF A PLURALITY OF HARQ PROCESSES

520

GENERATE A HARQ-ACK CODEBOOK FOR PDSCH
BASED ON THE HARQ FEEDBACK CONFIGURATIONS OF
THE PLURALITY OF HARQ PROCESSES

530

TRANSMIT THE HARQ-ACK CODEBOOK TO A NETWORK
DEVICE

600

610

DETERMINE RESPECTIVE HARQ FEEDBACK
CONFIGURATIONS OF A PLURALITY OF HARQ PROCESSES

620

RECEIVE, FROM A TERMINAL DEVICE, A HARQ-ACK
CODEBOOK FOR PDSCH GENERATED BASED ON
THE HARQ FEEDBACK CONFIGURATIONS

700

NETWORK DEVICE
110

TERMINAL DEVICE
120

710 GENERATION OF
DCI RELATED TO A
HARQ PROCESS

720 DCI TRANSMISSION

730 PDSCH TRANSMISSION
SCHEDULED BY DCI

740 GENERATION OF
TYPE-2 HARQ-ACK
CODEBOOK FOR PDSCH

750 HARQ-ACK CODEBOOK TRANSMISSION

CARRIER 1

(HARQ process with
feedback disabled)

CARRIER 2

(HARQ process with
feedback enabled)

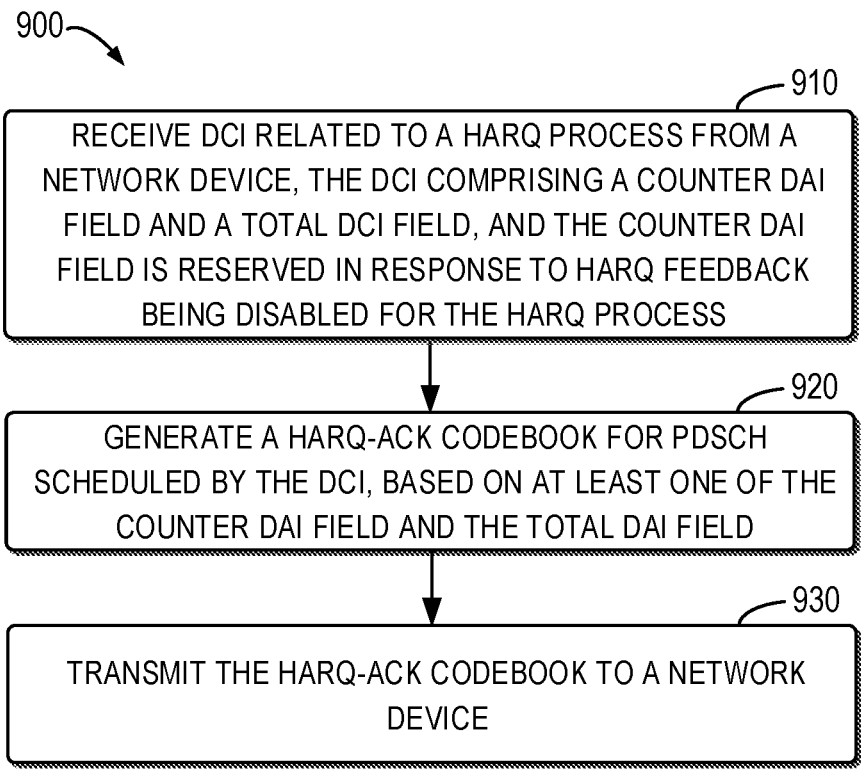

900

910

RECEIVE DCI RELATED TO A HARQ PROCESS FROM A NETWORK DEVICE, THE DCI COMPRISING A COUNTER DAI FIELD AND A TOTAL DCI FIELD, AND THE COUNTER DAI FIELD IS RESERVED IN RESPONSE TO HARQ FEEDBACK BEING DISABLED FOR THE HARQ PROCESS

920

GENERATE A HARQ-ACK CODEBOOK FOR PDSCH SCHEDULED BY THE DCI, BASED ON AT LEAST ONE OF THE COUNTER DAI FIELD AND THE TOTAL DAI FIELD

930

TRANSMIT THE HARQ-ACK CODEBOOK TO A NETWORK DEVICE

Fig. 9

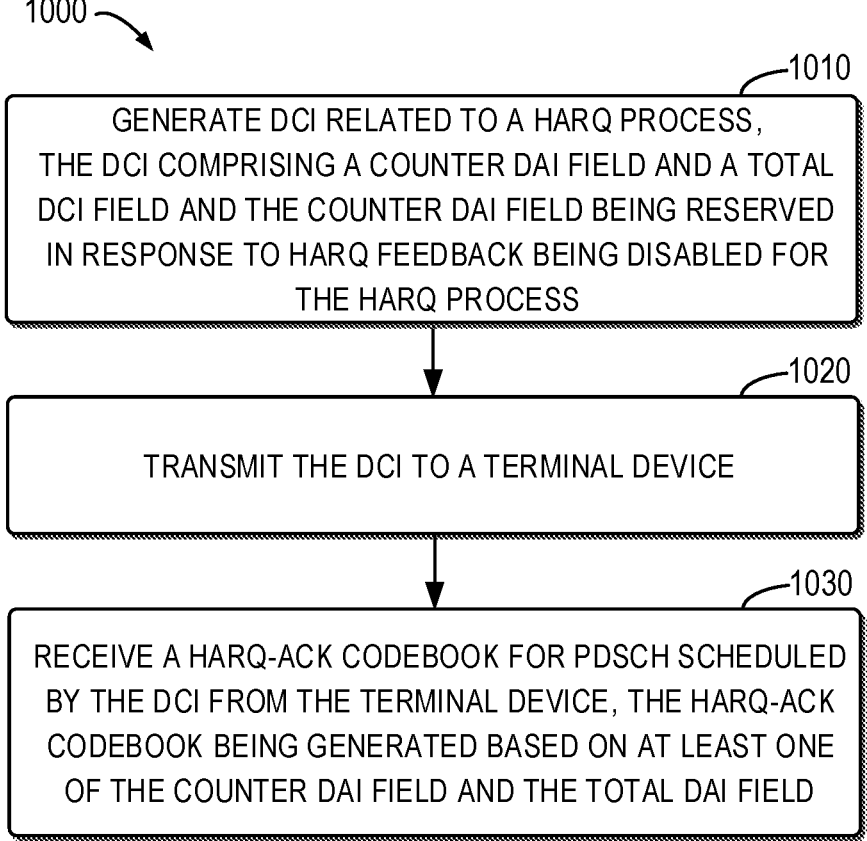

1000 —

1010

GENERATE DCI RELATED TO A HARQ PROCESS,
THE DCI COMPRISING A COUNTER DAI FIELD AND A TOTAL
DCI FIELD AND THE COUNTER DAI FIELD BEING RESERVED
IN RESPONSE TO HARQ FEEDBACK BEING DISABLED FOR
THE HARQ PROCESS

1020

TRANSMIT THE DCI TO A TERMINAL DEVICE

1030

RECEIVE A HARQ-ACK CODEBOOK FOR PDSCH SCHEDULED
BY THE DCI FROM THE TERMINAL DEVICE, THE HARQ-ACK
CODEBOOK BEING GENERATED BASED ON AT LEAST ONE
OF THE COUNTER DAI FIELD AND THE TOTAL DAI FIELD

RECEIVE DCI RELATED TO A HARQ PROCESS WITH HARQ FEEDBACK DISABLED FROM A NETWORK DEVICE

1120

GENERATE, FOR A PDSCH RECEPTION OCCASION CORRESPONDING TO THE DCI, A HARQ FEEDBACK BIT INDICATING A POSITIVE ACKNOWLEDGEMENT

1130

TRANSMIT A HARQ-ACK CODEBOOK COMPRISING THE HARQ FEEDBACK BIT TO THE NETWORK DEVICE

1200

1210

TRANSMIT, TO A TERMINAL DEVICE, DCI RELATED TO A HARQ PROCESS WITH HARQ FEEDBACK DISABLED

1220

RECEIVE A HARQ-ACK CODEBOOK FROM THE TERMINAL DEVICE, THE HARQ-ACK CODEBOOK COMPRISING A HARQ FEEDBACK BIT FOR A PDSCH RECEPTION OCCASION CORRESPONDING TO THE DCI AND THE HARQ FEEDBACK BIT INDICATING A POSITIVE ACKNOWLEDGEMENT

HARQ-ACK CODEBOOK HANDLING

TECHNICAL FIELD

Embodiments of the present disclosure generally relate to the field of telecommunication, and in particular, to methods, devices and computer readable storage media for hybrid automatic repeat request acknowledgement (HARQ-ACK) codebook handling.

BACKGROUND

5G New Radio (NR) systems are expected to meet world market demands of accessing and delivering services anywhere and anytime. Non-Terrestrial Network (NTN) is able to satisfy requests of anywhere and anytime connection by offering wide-area coverage and ensuring service availability, continuity, and scalability. Therefore, NTN is expected to be integrated into 5G NR systems.

SUMMARY

In general, example embodiments of the present disclosure provide methods, devices and computer readable storage media for HARQ-ACK codebook handling.

In a first aspect, there is provided a method. The method comprises determining, at a terminal device, respective hybrid automatic repeat request (HARQ) feedback configurations of a plurality of HARQ processes, wherein each HARQ feedback configuration indicates whether HARQ feedback is enabled or disabled for a corresponding HARQ process; and generating a HARQ-ACK codebook for Physical Downlink Shared Channel (PDSCH) based on the HARQ feedback configurations of the plurality of HARQ processes; and transmitting the HARQ-ACK codebook to a network device.

In a second aspect, there is provided a method. The method comprises determining, at a network device, respective HARQ feedback configurations of a plurality of HARQ processes, wherein each HARQ feedback configuration indicates whether HARQ feedback is enabled or disabled for a corresponding HARQ process; and receiving, from a terminal device, a HARQ-ACK codebook for PDSCH generated based on the HARQ feedback configurations of the plurality of HARQ processes.

In a third aspect, there is provided a method. The method comprises receiving, at a terminal device, downlink control information (DCI) related to a HARQ process from a network device, wherein the DCI comprises a counter downlink assignment indicator (DAI) field and a total DAI field, and the counter DAI field is reserved in response to HARQ feedback being disabled for the HARQ process; generating a HARQ-ACK codebook for PDSCH scheduled by the DCI, based on at least one of the counter DAI field and the total DAI field; and transmitting the HARQ-ACK codebook to the network device.

In a fourth aspect, there is provided a method. The method comprises generating, at a network device, DCI related to a HARQ process, wherein the DCI comprises a counter DAI field and a total DAI field, and the counter DAI field is reserved in response to HARQ feedback being disabled for the HARQ process; transmitting the DCI to a terminal device; and receiving a HARQ-ACK codebook for PDSCH scheduled by the DCI from the terminal device, wherein the HARQ-ACK codebook is generated based on at least one of the counter DAI field and the total DAI field.

In a fifth aspect, there is provided a method. The method comprises receiving, at a terminal device, DC related to a HARQ process with HARQ feedback disabled from a network device; generating, for a PDSCH reception corresponding to the DCI, a HARQ feedback bit indicating a positive acknowledgement; and transmitting a HARQ-ACK codebook comprising the HARQ feedback bit to the network device.

In a sixth aspect, there is provided a method. The method comprises transmitting, from a network device to a terminal device, DCI related to a HARQ process with HARQ feedback disabled; and receiving a HARQ-ACK codebook from the terminal device, wherein the HARQ-ACK codebook comprises a HARQ feedback bit for a PDSCH reception corresponding to the DCI and the HARQ feedback bit indicates a positive acknowledgement.

In a seventh aspect, there is provided a terminal device. The terminal device comprises a processor and a memory coupled to the processor. The memory stores instructions that when executed by the processor, cause the terminal device to perform the method according to the above first, third or fifth aspect of the present disclosure.

In an eighth aspect, there is provided a network device. The network device comprises a processor and a memory coupled to the processor. The memory stores instructions that when executed by the processor, cause the network device to perform the method according to the above second, fourth or sixth aspect of the present disclosure.

In a ninth aspect, there is provided a baseband processor of a terminal device configured to perform the method according to the above first, third or fifth aspect of the present disclosure.

In a tenth aspect, there is provided a baseband processor of a network device configured to perform the method according to the above second, fourth or sixth aspect of the present disclosure.

In an eleventh aspect, there is provided a computer readable storage medium comprising program instructions stored thereon. The instructions, when executed by an apparatus, cause the apparatus to perform the method according to the above first, third or fifth aspect of the present disclosure.

In a twelfth aspect, there is provided a computer readable storage medium comprising program instructions stored thereon. The instructions, when executed by an apparatus, cause the apparatus to perform the method according to the above second, fourth or sixth aspect of the present disclosure.

In a thirteenth aspect, there is provided a computer program product that is stored on a computer readable medium and includes machine-executable instructions. The machine-executable instructions, when being executed, cause a machine to perform the method according to the above first, third or fifth aspect of the present disclosure.

In a fourteenth aspect, there is provided a computer program product that is stored on a computer readable medium and includes machine-executable instructions. The machine-executable instructions, when being executed, cause a machine to perform the method according to the above second, fourth or sixth aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIG. 9 shows a flowchart of an example method for HARQ codebook construction based on DCI according to some example embodiments of the present disclosure;

FIG. 10 shows a flowchart of an example method for generating DCI related to HARQ processes according to some example embodiments of the present disclosure;

Throughout the drawings, the same or similar reference numerals represent the same or similar element.

DETAILED DESCRIPTION

Figure 1:
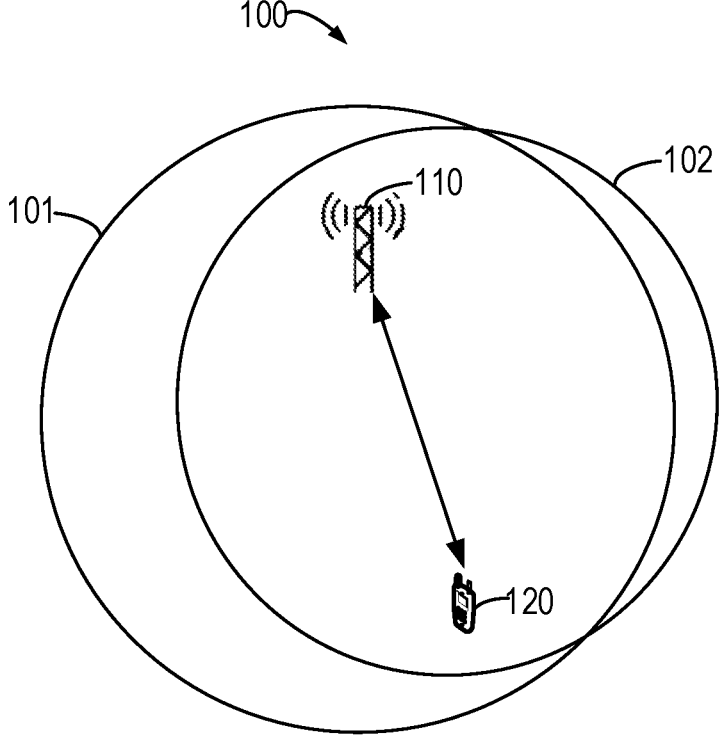
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As described above, NTN is expected to be integrated into 5G NR systems. One objective of the NTN work item on NR is HARQ enhancements for NTN. Recently, several agreements have been made regarding HARQ process number indication, HARQ feedback enabling/disabling, HARQ-ACK codebook construction and so on. However, several problems are still open to be solved. For example, regarding Type-2 HARQ-ACK codebook or Type-1 HARQ-ACK codebook for SPS PDSCH only, there is no HARQ feedback configuration about HARQ processes in a SPS configuration. In addition, it is unclear how to construct HARQ feedback bits for SPS PDSCH receptions associated with HARQ processes with HARQ feedback disabled. Regarding Type-2 HARQ-ACK codebook construction, it is unclear how to handle counter DAI and total DAI counting for DCI of PDSCH with HARQ feedback-disabled HARQ processes. Regarding Type-1 HARQ-ACK codebook construction, it is unclear how to generate feedback bits for HARQ processes with HARQ feedback disabled. Regarding Type-3 HARQ-ACK codebook construction, it is unclear how to handle feedback bits and NDI bits for HARQ processes with HARQ feedback disabled.

Embodiments of the present disclosure provide a solution for HARQ-ACK codebook handling, which can solve the above problems and one or more of other potential problems. This solution can facilitate HARQ enhancements for NTN. Principles and implementations of the present disclosure will be described in detail below with reference to the accompanying drawings.

FIG. 1 shows an example communication network 100 in which embodiments of the present disclosure can be implemented. The network 100 includes a network device 110 and a terminal device 120 served by the network device 110. The network 100 may provide one or more serving cells to serve the terminal device 120. Carrier Aggregation (CA) can be supported in the network 100, in which two or more component carriers (CCs) are aggregated in order to support a broader bandwidth. For example, in FIG. 1, the network device 110 may provide to the terminal device 120 a plurality of serving cells including one primary cell (Pcell) 101 corresponding to a primary CC and at least one secondary cell (Scell) 102 corresponding to at least one secondary CC. It is to be understood that the number of network devices, terminal devices and/or serving cells is only for the purpose of illustration without suggesting any limitations to the present disclosure. The network 100 may include any suitable number of network devices, terminal devices and/or serving cells adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In the network 100, the terminal device 120 and the network device 110 can communicate data and control information to each other. A link from the network device 110 to the terminal device 120 is referred to as a downlink (DL), while a link from the terminal device 120 to the network device 110 is referred to as an uplink (UL).

Figure 2:
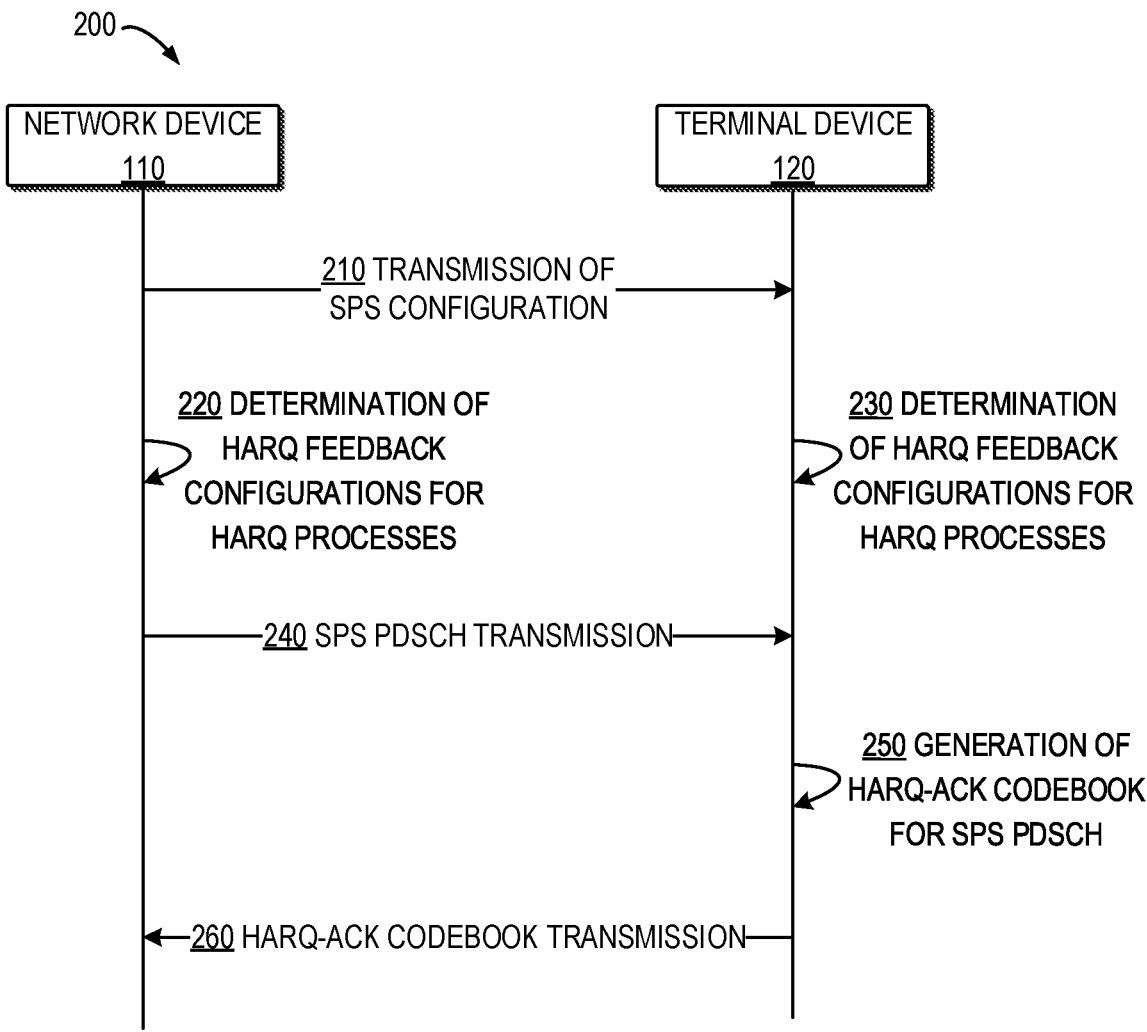
FIG. 2 illustrates an interaction diagram of an example process for HARQ-ACK codebook handling according to some example embodiments of the present disclosure.

As described above, regarding Type-2 HARQ-ACK codebook or Type-1 HARQ-ACK codebook for SPS PDSCH only, there is no HARQ feedback configuration about HARQ processes in a SPS configuration. In addition, it is unclear how to construct HARQ feedback bits for SPS PDSCH receptions associated with HARQ processes with HARQ feedback disabled. FIG. 2 illustrates an interaction diagram of an example process 200 for HARQ-ACK codebook construction (for example, the construction of a HARQ-ACK codebook for SPS PDSCH) according to some example embodiments of the present disclosure. In the following, the process 200 will be described with reference to FIG. 1. For example, the process 200 may involve the network device 110 and the terminal device 120 as shown in FIG. 1.

As shown in FIG. 2, the network device 110 may transmit 210 at least one SPS configuration corresponding to a plurality of HARQ processes to the terminal device 120. The terminal device 120 can determine 230, based on the at least one SPS configuration, HARQ feedback configurations of the plurality of HARQ processes, where each HARQ feedback configuration may indicate whether HARQ feedback is enabled or disabled for a corresponding HARQ process. The network device 110 can derive 220 the HARQ feedback configurations of the plurality of HARQ processes in a same way as the terminal device 120.

In some example embodiments, a SPS configuration may comprise a HARQ feedback field indicating whether HARQ feedback is enabled or disabled for HARQ processes comprised in the SPS configuration. For example, all the HARQ processes in a SPS configuration may share a same HARQ feedback configuration. That is, HARQ feedback may be enabled or disabled for all the HARQ processes in a SPS configuration. The SPS configuration may further comprise a periodicity field indicating a periodicity of SPS PDSCH transmissions and a nrofHARQ-Processes field indicating the total number of HARQ processes corresponding to the SPS configuration. The SPS configuration may also comprise a harq-ProcID-Offset field indicating an offset value for determining the HARQ process number (that is, the HARQ process identifier), which may have a range of [0, 31]. For example, for DL SPS PDSCH, the HARQ process number can be determined by: [floor (CURRENT_slot/ periodicity)] modulo nmfHARQ-Processes+harq-ProcID-Offset.

In some embodiments, with respect to a HARQ process comprised of a plurality of HARQ processes, if the at least one SPS configuration indicates a first HARQ feedback configuration for the HARQ process and a further configuration (such as, a PDSCH configuration or a PDSCH serving cell configuration) indicates a second HARQ feedback configuration for the HARQ process which is different from the first HARQ feedback configuration, the HARQ feedback configuration of the HARQ process can be determined as one of the following: the first HARQ feedback configuration, the second HARQ feedback configuration, a third HARQ feedback configuration indicating that HARQ feedback is enabled for the HARQ process, or a fourth HARQ feedback configuration indicating that HARQ feedback is disabled for the HARQ process. In this way, both the network device 110 and the terminal device 120 can determine respective HARQ feedback configurations of the plurality of HARQ processes.

As shown in FIG. 2, the network device 110 may perform 240 SPS PDSCH transmissions to the terminal device 120 based on the at least one SPS configuration. The terminal device 120 may perform SPS PDSCH receptions accordingly and generate 250 a HARQ-ACK codebook for the SPS PDSCH receptions. Then, the terminal device 120 transmits 260 the HARQ-ACK codebook for SPS PDSCH to the network device 110.

Figure 3:
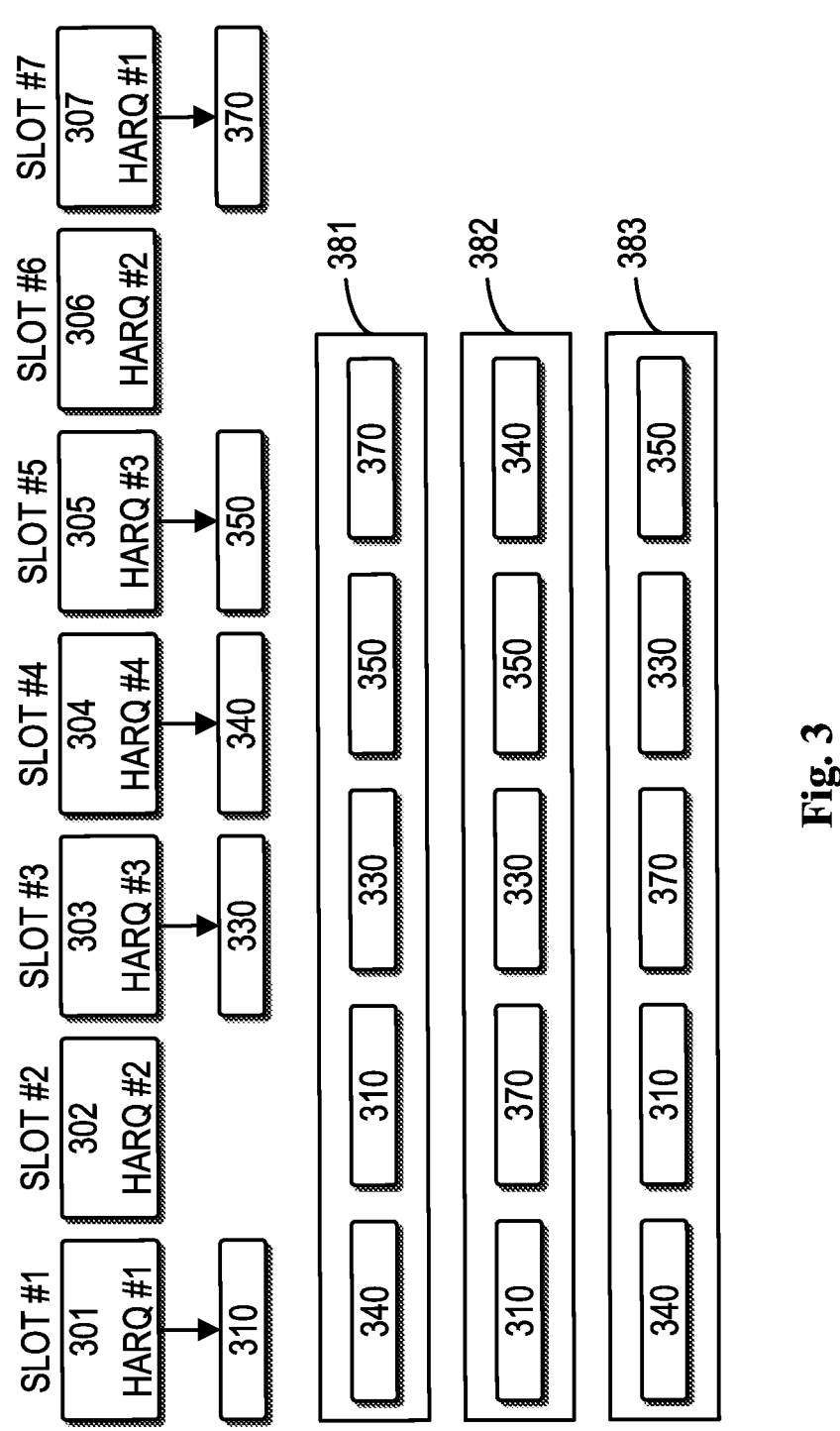
FIG. 3 illustrates example HARQ-ACK codebooks for SPS PDSCH according to some example embodiments of the present disclosure.

FIG. 3 illustrates example HARQ-ACK codebooks for SPS PDSCH according to some example embodiments of the present disclosure. As shown in FIG. 3, for example, SPS PDSCH reception 301 for HARQ process #1 occurs in slot #1; SPS PDSCH reception 302 for HARQ process #2 occurs in slot #2; SPS PDSCH reception 303 for HARQ process #3 occurs in slot #3; SPS PDSCH reception 304 for HARQ process #4 occurs in slot #4; SPS PDSCH reception 305 for HARQ process #3 occurs in slot #5; SPS PDSCH reception 306 for HARQ process #2 occurs in slot #6 and SPS PDSCH reception 307 for HARQ process #1 occurs in slot #7. In the example as shown in FIG. 3, it is assumed that there are two SPS configurations: SPS configuration #1 corresponding to HARQ process #4; and SPS configuration #2 corresponding to HARQ processes #1, #2 and #3. It is also assumed that HARQ feedback is disabled for HARQ processes #2 and HARQ feedback is enabled for HARQ processes #1, #3 and #4.

In some embodiments, the terminal device 120 may generate HARQ feedback bits only for HARQ processes with HARQ feedback enabled. As such, the size of the HARQ-ACK codebook can be reduced. For example, as shown in FIG. 2, since HARQ feedback is disabled for HARQ processes #2, the terminal device 120 may only generate HARQ feedback bits 310, 330, 340, 350 and 370 for SPS PDSCH receptions 301, 303, 304, 305 and 307, respectively. Then, the terminal device 120 may order the HARQ feedback bits 310, 330, 340, 350 and 370 to generate the HARQ-ACK codebook for SPS PDSCH. In some embodiments, the terminal device 120 may order the HARQ feedback bits first by their corresponding serving cell indices, second by their corresponding HARQ process number (that is, their corresponding HARQ process identifiers) and third by their corresponding SPS PDSCH reception slot number. In this way, as shown in FIG. 2, the terminal device 120 may generate a HARQ-ACK codebook 382 which includes the ordered HARQ feedback bits 310, 370, 330, 350, 340. Alternatively, in some embodiments, if HARQ processes in a same SPS configuration shares a same HARQ feedback configuration, the terminal device 120 may order the HARQ feedback bits first by their corresponding serving cell indices, second by their corresponding SPS configuration indices and third by their corresponding SPS PDSCH reception slot number. In this way, as shown in FIG. 2, the terminal device 120 may generate a HARQ-ACK codebook 381 which includes the ordered HARQ feedback bits 340, 310, 330, 350, 370. Alternatively, in some embodiments, if HARQ processes in a same SPS configuration have different HARQ feedback configurations (that is, HARQ feedback is enabled for some of the HARQ processes but disabled for other of the HARQ processes), the terminal device 120 may order the HARQ feedback bits first by their corresponding serving cell indices, second by their corresponding SPS configuration indices, third by their corresponding HARQ process number and fourth by their corresponding SPS PDSCH reception slot number. In this way, as shown in FIG. 2, the terminal device 120 may generate a HARQ-ACK codebook 383 which includes the ordered HARQ feedback bits 340, 310, 370, 330 and 350.

In some embodiments, the terminal device 120 may generate HARQ feedback bits for HARQ processes with HARQ feedback enabled and for HARQ processes with HARQ feedback disabled. As such, the size of the HARQ-ACK codebook is not reduced. The schemes described above could be applied accordingly.

Figure 4:
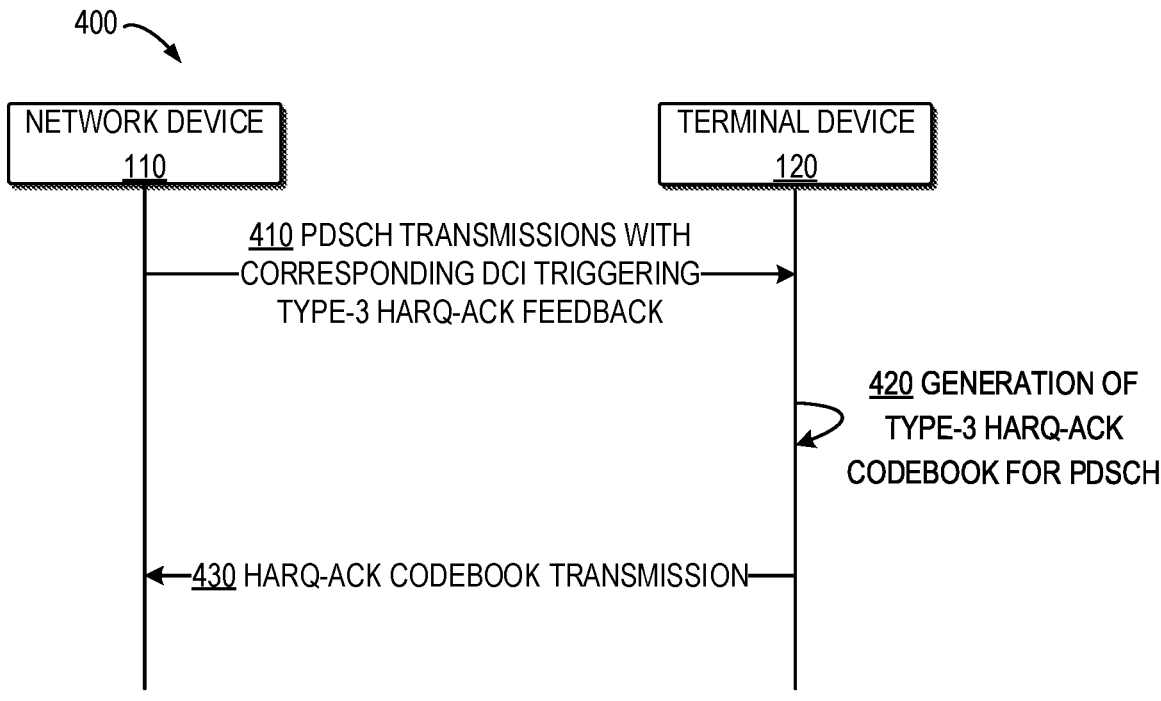
FIG. 4 illustrates an interaction diagram of an example process for HARQ-ACK codebook handling according to some example embodiments of the present disclosure.

As described above, regarding Type-3 HARQ-ACK codebook construction, it is unclear how to handle feedback bits and NDI bits for HARQ processes with HARQ feedback disabled. FIG. 4 illustrates an interaction diagram of an example process 400 for HARQ-ACK codebook construction (for example, the construction of a Type-3 HARQ-ACK codebook) according to some example embodiments of the present disclosure. In the following, the process 400 will be described with reference to FIG. 1. For example, the process 400 may involve the network device 110 and the terminal device 120 as shown in FIG. 1.

As shown in FIG. 4, the network device 110 may perform 410 PDSCH transmissions with corresponding DCI triggering the Type-3 HARQ-ACK feedback. The terminal device 120 may perform PDSCH receptions accordingly and generate 420, based on respective HARQ feedback configurations of a plurality of HARQ processes, a Type-3 HARQ-ACK codebook for PDSCH. Each HARQ feedback configuration may indicate whether HARQ feedback is enabled or disabled for a corresponding HARQ process. The terminal device 120 may transmit 430 the HARQ-ACK codebook to the network device 110.

In some example embodiments, the HARQ-ACK codebook may only include feedback bits and $NDI_{HARQ}$ bits for HARQ processes with HARQ feedback enabled. The HARQ-ACK codebook may include no feedback bit and no $NDI_{HARQ}$ bit for a HARQ process with HARQ feedback disabled. For example, if $NDI_{HARQ}=0$, for a HARQ process with HARQ feedback enabled, the HARQ-ACK codebook may include $NDI_{HARQ}$ bits together with all actual HARQ feedback bits corresponding to the HARQ process. If $NDI_{HARQ}=0$, for a HARQ process with HARQ feedback disabled, the HARQ-ACK codebook may not include $NDI_{HARQ}$ bits or HARQ feedback bits corresponding to the HARQ process. If $NDI_{HARQ}=1$, for a HARQ process with HARQ feedback enabled, the HARQ-ACK codebook may include unreported HARQ feedback bits, NACK for the reported HARQ feedback bits. If $NDI_{HARQ}=1$, for a HARQ process with HARQ feedback disabled, the HARQ-ACK codebook may not include $NDI_{HARQ}$ bits or HARQ feedback bits corresponding to the HARQ process.

For example, the pseudo codes related to the above scheme may be read as follows:

```
while c < N_cells              // N_cells denotes the number of serving cells
   while h < N_HARQ,c          // N_HARQ,c denotes the number of HARQ
processes for the serving cell c
      if HARQ process number h is configured with disabled HARQ
      feedback
         h = h + 1;
      else {remaining pseudo codes apply here}.
```

Alternatively, in some example embodiments, the HARQ-ACK codebook may include HARQ feedback bits and $NDI_{HARQ}$ bits for all the HARQ processes, but $NDI_{HARQ}$ bits are set to a predetermined value for a HARQ processes with HARQ feedback disabled. Alternatively, in some embodiments, the HARQ-ACK codebook may include feedback bits and $NDI_{HARQ}$ bits for HARQ processes with HARQ feedback enabled, but only include feedback bits for HARQ processes with HARQ feedback disabled. That is, the HARQ-ACK codebook may include no $NDI_{HARQ}$ bit for a HARQ process with HARQ feedback disabled.

For example, if $NDI_{HARQ}=0$, for a HARQ process with HARQ feedback enabled, the HARQ-ACK codebook may include $NDI_{HARQ}$ bits together with all actual HARQ feedback bits corresponding to the HARQ process. If $NDI_{HARQ}=0$, for a HARQ process with HARQ feedback disabled, the HARQ-ACK codebook may not include $NDI_{HARQ}$ bits corresponding to the HARQ process or the $NDI_{HARQ}$ bits corresponding to the HARQ process may be set to a predetermined value. For example, the $NDI_{HARQ}$ bits corresponding to the HARQ process with HARQ feedback disabled may be reserved or reinterpreted or set to 0. For example, if $NDI_{HARQ}=0$ and/or $NDI_{HARQ}=1$, for a Code Block Group (CBG) or a transport block (TB) corresponding to a HARQ process with HARQ feedback disabled, the HARQ feedback bit can be determined to be any of the following: ACK/NACK, always ACK or always NACK.

For example, the pseudo codes related to the above scheme may be read as follows:

```
while c < N_cells              // N_cells denotes the number of serving cells
   while h < N_HARQ,c          // N_HARQ,c denotes the number of HARQ
processes for the serving cell c
      if NDI_HARQ = 0
         if N^CGB/TB, max > 0
            while t < N_TB,c   // N_TB,c denotes the number of TBs for the
serving cell c
               Put HARQ feedback bits for the CBG in the codebook;
               if HARQ process number h is configured with enabled
HARQ feedback
                  Put NDI bits in the codebook;
               else
                  Set NDI bits as 0 in the codebook or ignore NDI bits;
         else
            while t < N_TB, c
               Put HARQ feedback bits for the TB in the codebook;
               if HARQ process number h is configured with enabled
HARQ feedback
                  Put NDI bits in the codebook;
               else
                  Set NDI bits as 0 in the codebook or ignore NDI bits;
      {remaining pseudo codes apply here}.
```

In some example embodiments, the HARQ-ACK codebook may include HARQ feedback bits for all the HARQ processes. In some example embodiments, HARQ feedback bits for HARQ processes with HARQ feedback disabled can be located after those for HARQ processes with HARQ feedback enabled, for example, as a HARQ-ACK subcodebook. In some example embodiments, HARQ feedback bits for all the HARQ processes can be ordered by their respective HARQ process number. In some example embodiments, for a CBG or a TB corresponding to a HARQ process with HARQ feedback disabled, the HARQ feedback bit can be determined to be any of the following: ACK/NACK, always ACK or always NACK.

Figure 5:
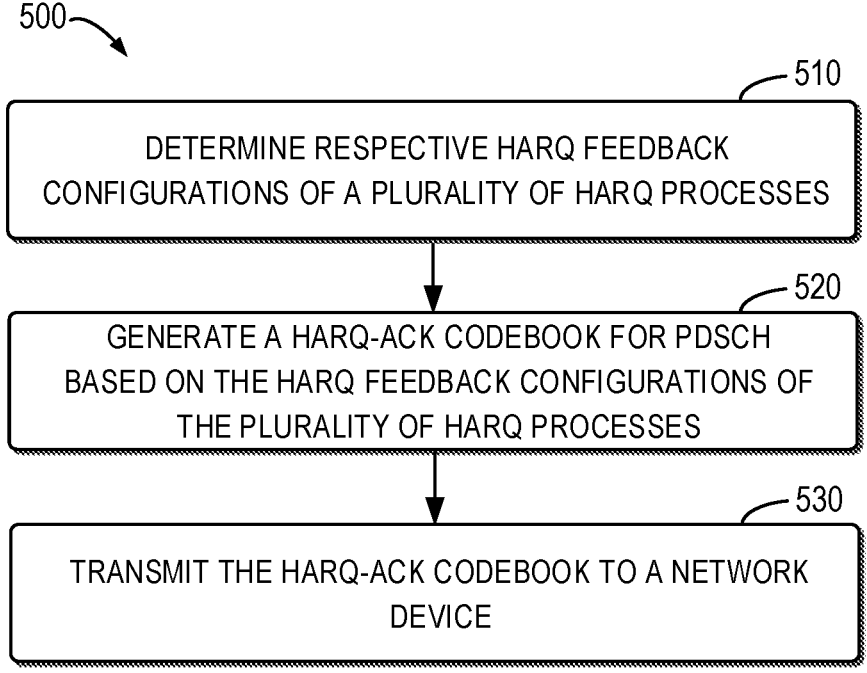
FIG. 5 shows a flowchart of an example method for HARQ-ACK codebook construction according to some example embodiments of the present disclosure.

FIG. 5 shows a flowchart of an example method 500 for HARQ-ACK codebook construction according to some example embodiments of the present disclosure. The method 500 can be implemented at the terminal device 120 as shown in FIG. 1, FIG. 2 and/or FIG. 4. It is to be understood that the method 500 may include additional blocks not shown and/or may omit some shown blocks, and the scope of the present disclosure is not limited in this regard.

At block 510, the terminal device 120 determines respective HARQ feedback configurations of a plurality of HARQ processes. Each HARQ feedback configuration indicates whether HARQ feedback is enabled or disabled for a corresponding HARQ process.

At block 520, the terminal device 120 generates a HARQ-ACK codebook for PDSCH based on the HARQ feedback configurations of the plurality of HARQ processes.

At block 530, the terminal device 120 transmits the HARQ-ACK codebook to a network device (for example, the network device 110 as shown in FIG. 1, FIG. 2 and/or FIG. 4).

In some example embodiments, the plurality of HARQ processes may comprise a HARQ process with HARQ feedback disabled. The terminal device 120 may generate the HARQ-ACK codebook by including no HARQ feedback bit and no NDI corresponding to the HARQ process.

In some example embodiments, the plurality of HARQ processes may comprise a HARQ process with HARQ feedback disabled. The terminal device 120 may generate the HARQ-ACK codebook by including at least one HARQ feedback bit corresponding to the HARQ process and setting a NDI corresponding to the HARQ process to a predetermined value. Alternatively, the terminal device 120 may generate the HARQ-ACK codebook by including the at least one HARQ feedback bit and no NDI corresponding to the HARQ process.

In some example embodiments, the plurality of HARQ processes may comprise a first HARQ process with HARQ feedback enabled and a second HARQ process with HARQ feedback disabled. The terminal device 120 may generate the HARQ-ACK codebook by including a first HARQ feedback bit corresponding to the first HARQ process and a second HARQ feedback bit corresponding to the second HARQ process. In some example embodiments, the second HARQ feedback bit may be located after the first HARQ feedback bit. Alternatively, the first and second HARQ feedback bits may be ordered by HARQ process number of the first and second HARQ processes.

In some example embodiments, the HARQ-ACK codebook may be a Type-3 HARQ-ACK codebook. As described above, regarding Type-3 HARQ-ACK codebook construction, it is conventionally unclear how to handle feedback bits and NDI bits for HARQ processes with HARQ feedback disabled. In some example embodiments, the HARQ-ACK codebook may only include feedback bits and $NDI_{HARQ}$ bits for HARQ processes with HARQ feedback enabled. Alternatively, in some example embodiments, the HARQ-ACK codebook may include HARQ feedback bits and $NDI_{HARQ}$ bits for all the HARQ processes, but $NDI_{HARQ}$ bits are set to a predetermined value for a HARQ processes with HARQ feedback disabled. Alternatively, in some example embodiments, the HARQ-ACK codebook may include feedback bits and $NDI_{HARQ}$ bits for HARQ processes with HARQ feedback enabled, but only include feedback bits for HARQ processes with HARQ feedback disabled.

In some example embodiments, the terminal device 120 may determine respective HARQ feedback configurations of a plurality of HARQ processes by: receiving at least one SPS configuration corresponding to the plurality of HARQ processes from the network device; and determining the HARQ feedback configurations of the plurality of HARQ processes based on the at least one SPS configuration. In some example embodiments, for a HARQ process comprised of a plurality of HARQ processes, in response to the at least one SPS configuration indicating a first HARQ feedback configuration for the HARQ process and a further configuration indicating a second HARQ feedback configuration for the HARQ process, the terminal device 120 may determine the HARQ feedback configuration of the HARQ process as one of the following: the first HARQ feedback configuration; the second HARQ feedback configuration; a third HARQ feedback configuration indicating that HARQ feedback is enabled for the HARQ process; or a fourth HARQ feedback configuration indicating that HARQ feedback is disabled for the HARQ process.

In some example embodiments, the terminal device 120 may generate the HARQ-ACK codebook for SPS PDSCH based on the HARQ feedback configurations of the plurality of HARQ processes, where the HARQ-ACK codebook is a Type-1 HARQ-ACK codebook or Type-2 HARQ-ACK codebook.

In some example embodiments, the terminal device 120 may generate the HARQ-ACK codebook for SPS PDSCH by: generating HARQ feedback bits for at least one HARQ process comprised in the plurality of HARQ processes, where HARQ feedback is enabled for the at least one HARQ process; ordering the HARQ feedback bits first by their corresponding serving cell indices, second by their corresponding HARQ process number and third by their corresponding SPS PDSCH reception slot number; and generating the HARQ-ACK codebook comprising the ordered HARQ-ACK bits.

In some example embodiments, HARQ processes corresponding to a SPS configuration may share a same HARQ feedback configuration. The terminal device 120 may generate the HARQ-ACK codebook by: generating HARQ feedback bits for at least one HARQ process comprised in the plurality of HARQ processes, wherein HARQ feedback is enabled for the at least one HARQ process; ordering the HARQ feedback bits first by their corresponding serving cell indices, second by their corresponding SPS configuration indices and third by their corresponding SPS PDSCH reception slot number; and generating the HARQ-ACK codebook comprising the ordered HARQ-ACK bits.

In some example embodiments, HARQ processes corresponding to a SPS configuration may have different HARQ feedback configurations. The terminal device 120 may generate the HARQ-ACK codebook by: generating HARQ feedback bits for at least one HARQ process comprised in the plurality of HARQ processes, wherein HARQ feedback is enabled for the at least one HARQ process; ordering the HARQ feedback bits first by their corresponding serving cell indices, second by their corresponding SPS configuration indices, third by their corresponding HARQ process number and fourth by their corresponding SPS PDSCH reception slot number; and generating the HARQ-ACK codebook comprising the ordered HARQ-ACK bits.

Figure 6:
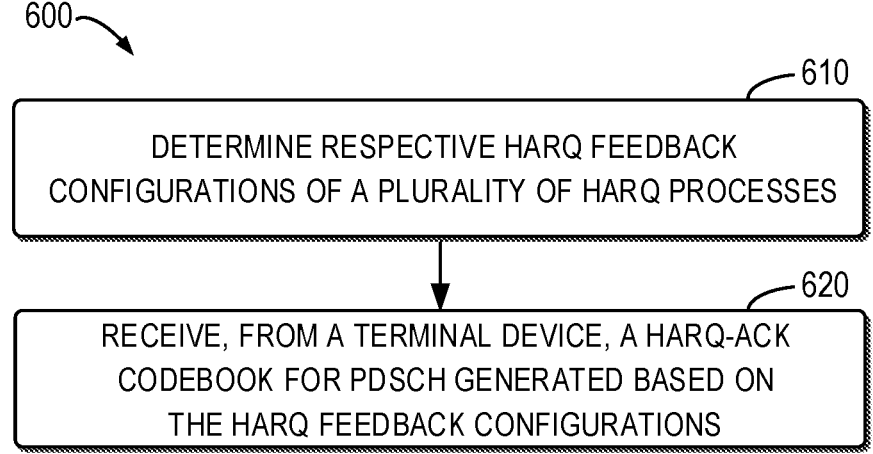
FIG. 6 shows a flowchart of an example method for a network device to receive a HARQ-ACK codebook from a terminal device according to some example embodiments of the present disclosure.

FIG. 6 shows a flowchart of an example method 600 for a network device to receive a HARQ-ACK codebook from a terminal device according to some example embodiments of the present disclosure. The method 600 can be implemented at the network device 110 as shown in FIG. 1, FIG. 2 and/or FIG. 4. It is to be understood that the method 600 may include additional blocks not shown and/or may omit some shown blocks, and the scope of the present disclosure is not limited in this regard.

At block 610, the network device 110 determines respective HARQ feedback configurations of a plurality of HARQ processes. Each HARQ feedback configuration indicates whether HARQ feedback is enabled or disabled for a corresponding HARQ process.

At block 620, the network device 110 receives, from a terminal device (for example, the terminal device 120 as shown in FIG. 1, FIG. 2 and/or FIG. 4), a HARQ-ACK codebook for PDSCH generated based on the HARQ feedback configurations of the plurality of HARQ processes.

In some example embodiments, the plurality of HARQ processes may comprise a HARQ process with HARQ feedback disabled. The HARQ-ACK codebook may include no HARQ feedback bit and no NDI corresponding to the HARQ process.

In some example embodiments, the plurality of HARQ processes may comprise a HARQ process with HARQ feedback disabled. The HARQ-ACK codebook may include at least one HARQ feedback bit corresponding to the second HARQ process. A NDI corresponding to the HARQ process may be set to a predetermined value in the HARQ-ACK codebook or may not be included in the HARQ-ACK codebook.

In some example embodiments, the plurality of HARQ processes may comprise a first HARQ process with HARQ feedback enabled and a second HARQ process with HARQ feedback disabled. The HARQ-ACK codebook may include a first HARQ feedback bit corresponding to the first HARQ process and a second HARQ feedback bit corresponding to the second HARQ process. In some example embodiments, the second HARQ feedback bit may be located after the first HARQ feedback bit. Alternatively, the first and second HARQ feedback bits may be ordered by HARQ process number of the first and second HARQ processes.

In some example embodiments, the network device 110 may determine the HARQ feedback configurations of the plurality of HARQ processes by: determining the HARQ feedback configurations of the plurality of HARQ processes based on at least one SPS configuration corresponding to the plurality of HARQ processes. In some example embodiments, the network device 110 may transmit the at least one SPS configuration the terminal device. In some example embodiments, for a HARQ process comprised of a plurality of HARQ processes, in response to the at least one SPS configuration indicating a first HARQ feedback configuration for the HARQ process and a further configuration indicating a second HARQ feedback configuration for the HARQ process, the network device 110 may determine the HARQ feedback configuration of the HARQ process as one of the following: the first HARQ feedback configuration; the second HARQ feedback configuration; a third HARQ feedback configuration indicating that HARQ feedback is enabled for the HARQ process; or a fourth HARQ feedback configuration indicating that HARQ feedback is disabled for the HARQ process.

In some example embodiments, the network device 110 may receive the HARQ-ACK codebook for SPS PDSCH generated based on the HARQ feedback configurations of the plurality of HARQ processes, where the HARQ-ACK codebook is a Type-1 HARQ-ACK codebook or Type-2 HARQ-ACK codebook.

In some example embodiments, the HARQ-ACK codebook may comprise HARQ feedback bits for at least one HARQ process comprised in the plurality of HARQ processes, HARQ feedback being enabled for the at least one HARQ process. The HARQ feedback bits may be ordered first by their corresponding serving cell indices, second by their corresponding HARQ process number and third by their corresponding SPS PDSCH reception slot number.

In some example embodiments, HARQ processes corresponding to a SPS configuration may share a same HARQ feedback configuration. The HARQ-ACK codebook may comprise HARQ feedback bits for at least one HARQ process comprised in the plurality of HARQ processes, HARQ feedback being enabled for the at least one HARQ process. The HARQ feedback bits may be ordered first by their corresponding serving cell indices, second by their corresponding SPS configuration indices and third by their corresponding SPS PDSCH reception slot number.

In some example embodiments, HARQ processes corresponding to a SPS configuration may have different HARQ feedback configurations. The HARQ-ACK codebook may comprise HARQ feedback bits for at least one HARQ process comprised in the plurality of HARQ processes, HARQ feedback being enabled for the at least one HARQ process. The HARQ feedback bits may be ordered first by their corresponding serving cell indices, second by their corresponding SPS configuration indices, third by their corresponding HARQ process number and fourth by their corresponding SPS PDSCH reception slot number.

Figure 7:
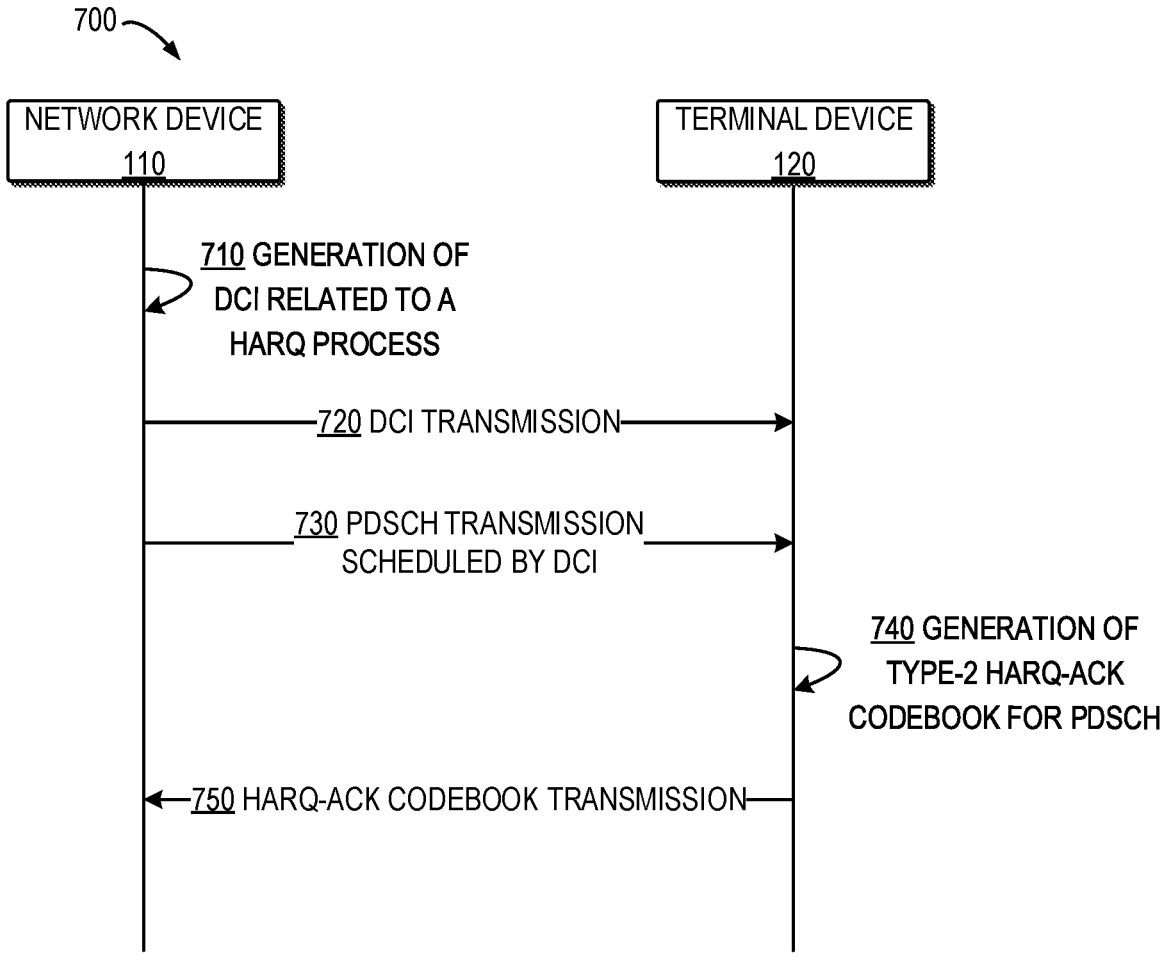
FIG. 7 illustrates an interaction diagram of an example process for HARQ-ACK codebook handling according to some example embodiments of the present disclosure.

As described above, regarding Type-2 HARQ-ACK codebook construction, it is unclear how to handle counter DAI and total DAI counting for DCI of PDSCH with HARQ feedback-disabled HARQ processes. FIG. 7 illustrates an interaction diagram of an example process 700 for HARQ-ACK codebook construction (for example, the construction of a Type-2 HARQ-ACK codebook) according to some example embodiments of the present disclosure. In the following, the process 700 will be described with reference to FIG. 1. For example, the process 700 may involve the network device 110 and the terminal device 120 as shown in FIG. 1.

As shown in FIG. 7, the network device 110 may generate 710 DCI related to a HARQ process and transmit 720 the DCI to the terminal device 120. The terminal device 120 may decode the DCI.

In some example embodiments, the DCI may comprise a counter DAI (c-DAI) field and a total DAI (t-DAI) field. The c-DAI field may be set to a reserved value for a HARQ process with HARQ feedback disabled, while the t-DAI field may be set to the total number of HARQ-ACK bits present to the current Physical Downlink Control Channel (PDCCH) monitoring occasion. That is, if HARQ feedback is enabled for the HARQ process, both the c-DAI field and the t-DAI field are set to their true values. If HARQ feedback is disabled for the HARQ process, only the t-DAI field is set to its true value and the c-DAI field is set to a reserved value.

Figure 8:
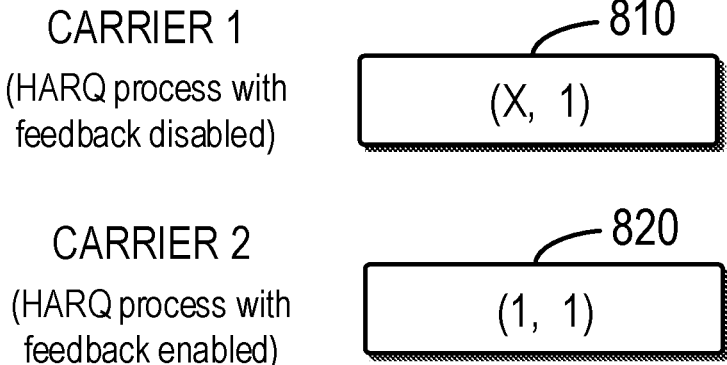
FIG. 8 illustrates counter DAI and total DAI counting for DCI of PDSCH with HARQ feedback-enabled/disabled HARQ processes according to some example embodiments of the present disclosure.

FIG. 8 illustrates an example of such embodiments. As shown in FIG. 8, carrier 1 may deliver PDSCH with HARQ feedback disabled HARQ processes and carrier 2 delivers PDSCH with HARQ feedback enabled HARQ processes. DCI 810 on carrier 1 is for a HARQ process with HARQ feedback disabled, where the c-DAI field is set to a reserved value "X" and the t-DAI field is set to the total number of HARQ-ACK bits present to the current PDCCH monitoring occasion. DCI 820 on carrier 2 is for a HARQ process with HARQ feedback enabled, where the c-DAI field is set to the accumulative number of HARQ-ACK bits present to the current serving cell and the current PDCCH monitoring occasion and the t-DAI field is set to the total number of HARQ-ACK bits present to the current PDCCH monitoring occasion. In this way, if the terminal device 120 decodes the PDCCH/PDSCH on carrier 1 but fails to decode the PDCCH on carrier 2, the terminal device 120 can still know the exact number of HARQ-ACK bits to feedback based on the t-DAI detected on carrier 1, so as to address the issue of missing last DCI.

In some example embodiments, if HARQ feedback is disabled for the HARQ process, the c-DAI field in the DCI can be reused to indicate the Most Significant Bit (MSB) or the Least Significant Bit (LSB) of the HARQ process number. Traditionally, in the existing DCI format, the HARQ process number field is 4 bits. By reusing 1 bit from the DAI field for indicating the HARQ process number, at most 32 HARQ processes can be supported. In some example embodiments, a HARQ process with HARQ feedback disabled may have a process number larger than 16.

As shown in FIG. 7, the network device 110 may perform 730 a PDSCH transmission scheduled by the DCI to the terminal device 120 and the terminal device 120 may perform a PDSCH reception based on the decoded DCI. The terminal device 120 may generate 740 a Type-2 HARQ-ACK codebook for PDSCH scheduled by the DCI and transmit 750 the HARQ-ACK codebook to the network device 110.

In some example embodiments, in accordance with a determination that HARQ feedback is disabled for the HARQ process, the terminal device 120 may generate the HARQ-ACK codebook based on the t-DAI comprised in the decoded DCI. In some example embodiments, in accordance with a determination that HARQ feedback is enabled for the HARQ process, the terminal device 120 may generate the HARQ-ACK codebook based on the c-DAI and the t-DCI comprised in the decoded DCI. With reference back to the example as shown in FIG. 8, if the terminal device 120 decodes the PDCCH/PDSCH on carrier 1 but fails to decode the PDCCH on carrier 2, the terminal device 120 can still know the exact number of HARQ-ACK bits to feedback based on the t-DAI detected on carrier 1. In this way, the terminal device 120 can reply a negative acknowledgement (NACK) for this case.

In some example embodiments, in accordance with a determination that HARQ feedback is disabled for the HARQ process, the c-DAI field in the DCI may be used to the MSB or LSB of the HARQ process number for the HARQ process with HARQ feedback disabled. In this event, the terminal device 120 can determine a HARQ process number (also referred to as "HARQ process identifier") for the HARQ process at least based on the c-DAI field.

FIG. 9 shows a flowchart of an example method 900 for HARQ codebook construction based on DCI according to some example embodiments of the present disclosure. For example, the method 900 can be used to construct a Type-2 HARQ-ACK codebook. The method 900 can be implemented at the terminal device 120 as shown in FIG. 1 and/or FIG. 7. It is to be understood that the method 900 may include additional blocks not shown and/or may omit some shown blocks, and the scope of the present disclosure is not limited in this regard.

At block 910, the terminal device 120 receives DCI related to a HARQ process from a network device (for example, the network device 110). The DCI comprises a counter DAI field and a total DAI field, and the counter DAI field is reserved in response to HARQ feedback being disabled for the HARQ process.

At block 920, the terminal device 120 generates a HARQ-ACK codebook for PDSCH scheduled by the DCI, based on at least one of the counter DAI field and the total DAI field.

In some example embodiments, in accordance with a determination that HARQ feedback is disabled for the HARQ process, the terminal device 120 may generate the HARQ-ACK codebook based on the total DAI field.

In some example embodiments, in accordance with a determination that HARQ feedback is enabled for the HARQ process, the terminal device 120 may generate the HARQ-ACK codebook based on the counter DAI field and the total DAI field.

At block 930, the terminal device 120 transmits the HARQ-ACK codebook to the network device.

In some example embodiments, in accordance with a determination that HARQ feedback is disabled for the HARQ process, the terminal device 120 may determine a HARQ process number for the HARQ process at least based on the counter DAI field.

FIG. 10 shows a flowchart of an example method 1000 for generating DCI related to HARQ processes according to some example embodiments of the present disclosure. The method 1000 can be implemented at the network device 110 as shown in FIG. 1 and/or FIG. 7. It is to be understood that the method 1000 may include additional blocks not shown and/or may omit some shown blocks, and the scope of the present disclosure is not limited in this regard.

At block 1010, the network device 110 generates DCI related to a HARQ process. The DCI comprises a counter DAI field and a total DAI field, and the counter DAI field is reserved in response to HARQ feedback being disabled for the HARQ process.

In some example embodiments, in accordance with a determination that HARQ feedback is disabled for the HARQ process, the network device 110 may indicate a HARQ process number for the HARQ process with the counter DAI field.

At block 1020, the network device 110 transmits the DCI to a terminal device (for example, the terminal device 120 as shown in FIG. 1).

At block 1030, the network device 110 receives a HARQ-ACK codebook for PDSCH scheduled by the DCI from the terminal device. The HARQ-ACK codebook is generated based on at least one of the counter DAI field and the total DAI field.

In some example embodiments, in accordance with a determination that HARQ feedback is disabled for the HARQ process, the network device 110 may receive the HARQ-ACK codebook generated based on the total DAI field from the terminal device.

In some example embodiments, in accordance with a determination that HARQ feedback is enabled for the HARQ process, the network device 110 may receive the HARQ-ACK codebook generated based on the counter DAI field and the total DAI field from the terminal device.

In some example embodiments, the HARQ-ACK codebook may be a Type-2 HARQ-ACK codebook.

As described above, regarding Type-1 HARQ-ACK codebook construction, it is unclear how to generate feedback bits for HARQ processes with HARQ feedback disabled. The Type-1 HARQ-ACK codebook is semi-statically constructed. The size of type-1 HARQ-ACK codebook depends on the total number of candidate PDSCH reception occasions, rather than whether or not there is actually scheduled PDSCH. The process of determining occasions for candidate PDSCH receptions or SPS PDSCH release may be the same as a legacy way. However, the process of determining HARQ-ACK bits may be modified.

In some example embodiments, if the terminal device 120 fails to detect a corresponding PDCCH, the terminal device 120 may generate feedback bits indicating NACK in the HARQ-ACK codebook. In some example embodiments, if the terminal device 120 detects a corresponding PDCCH related to a HARQ process with HARQ feedback disabled, the terminal device 120 may generate feedback bits indicating ACK for the HARQ process in the HARQ-ACK codebook. This can facilitate the network device 110 to schedule higher layer retransmission. For example, if the maximum number of TBs is 2 and spatial bundling is not configured, the terminal device 120 may generate 2 feedback bits indicating ACK. If the maximum number of TBs is 2 and spatial bundling is configured, the terminal device 120 may generate 1 feedback bit indicating ACK. If the maximum number of TBs is 1, the terminal device 120 may generate 1 feedback bit indicating ACK. If CBG is configured, the terminal device 120 may generate $N^{CBG/TB, \, max}$ feedback bits indicating ACK. If the terminal device 120 detects a corresponding PDCCH related to a HARQ process with HARQ feedback enabled, the terminal device 120 may generate feedback bits indicating ACK or NACK based on an actual decoding result as a legacy way.

Figure 11:
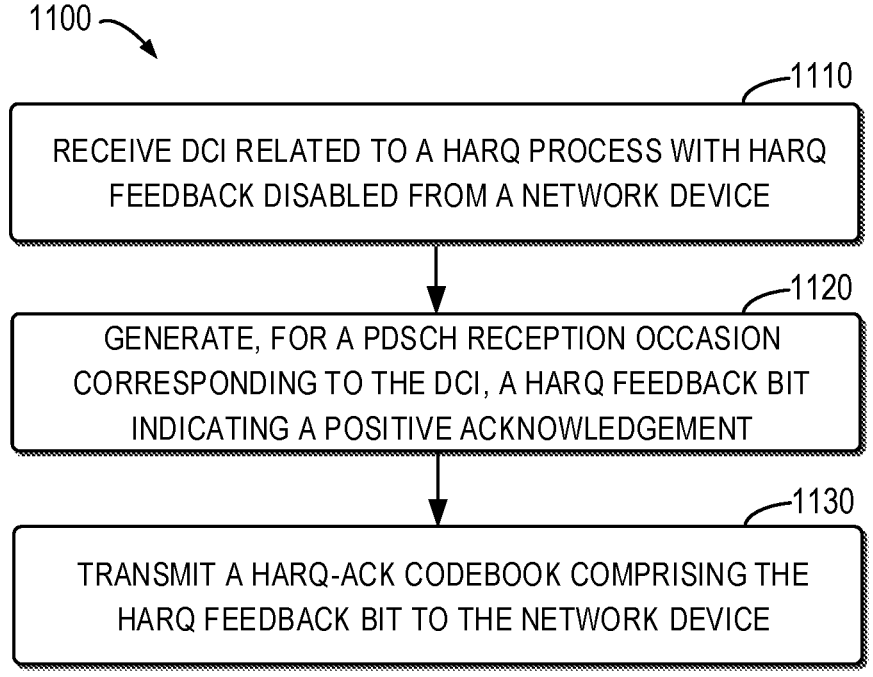
FIG. 11 shows a flowchart of an example method for HARQ codebook construction based on DCI with HARQ feedback disabled according to some example embodiments of the present disclosure.

FIG. 11 shows a flowchart of an example method 1100 for HARQ codebook construction based on DCI with HARQ feedback disabled according to some example embodiments of the present disclosure. For example, the method 1100 can be used to construct a Type-1 HARQ-ACK codebook. The method 1100 can be implemented at the terminal device 120 as shown in FIG. 1. It is to be understood that the method 1100 may include additional blocks not shown and/or may omit some shown blocks, and the scope of the present disclosure is not limited in this regard.

At block 1110, the terminal device 120 receives DCI related to a HARQ process with HARQ feedback disabled from a network device (for example, the network device 110).

At block 1120, the terminal device 120 generates, for a PDSCH reception corresponding to the DCI, a HARQ feedback bit indicating a positive acknowledgement.

At block 1130, the terminal device 120 transmits a HARQ-ACK codebook comprising the HARQ feedback bit to the network device.

Figure 12:
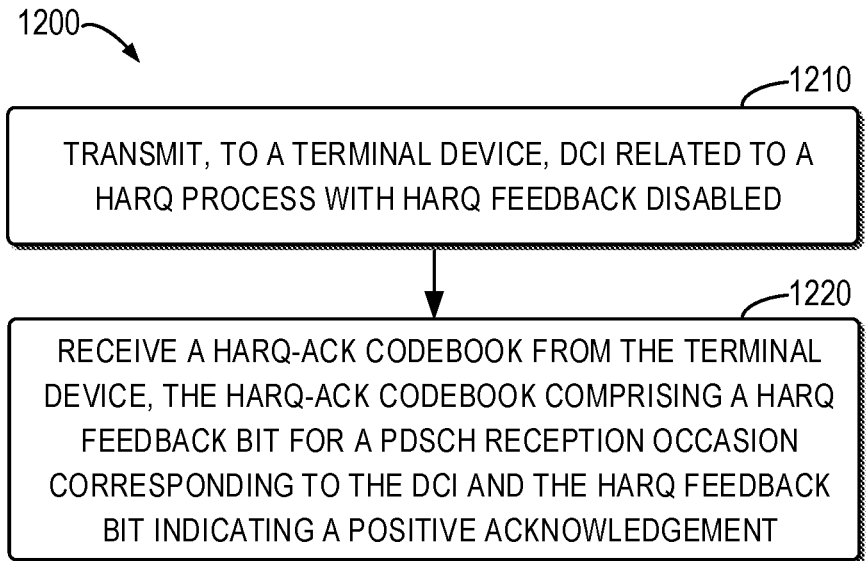
FIG. 12 shows a flowchart of an example method for generating DCI related to HARQ processes with HARQ feedback disabled according to some example embodiments of the present disclosure.

FIG. 12 shows a flowchart of an example method 1200 for generating DCI related to HARQ processes with HARQ feedback disabled according to some example embodiments of the present disclosure. The method 1200 can be implemented at the network device 110 as shown in FIG. 1. It is to be understood that the method 1200 may include additional blocks not shown and/or may omit some shown blocks, and the scope of the present disclosure is not limited in this regard.

At block 1210, the network device 110 transmits, to a terminal device (for example, the terminal device 120 as shown in FIG. 1), DCI related to a HARQ process with HARQ feedback disabled.

At block 1220, the network device 110 receives a HARQ-ACK codebook from the terminal device 120. The HARQ-ACK codebook comprises a HARQ feedback bit for a PDSCH reception corresponding to the DCI and the HARQ feedback bit indicates a positive acknowledgement.

In some example embodiments, the HARQ-ACK codebook may be a Type-1 HARQ-ACK codebook.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 comprises: means for determining, at a terminal device, respective HARQ feedback configurations of a plurality of HARQ processes, wherein each HARQ feedback configuration indicates whether HARQ feedback is enabled or disabled for a corresponding HARQ process; means for generating a HARQ-ACK codebook for PDSCH based on the HARQ feedback configurations of the plurality of HARQ processes; and means for transmitting the HARQ-ACK codebook to a network device.

In some example embodiments, the plurality of HARQ processes comprises a HARQ process with HARQ feedback disabled and the means for generating the HARQ-ACK codebook comprises: means for generating the HARQ-ACK codebook by including no HARQ feedback bit and no new data indicator (NDI) corresponding to the HARQ process.

In some example embodiments, the plurality of HARQ processes comprises a HARQ process with HARQ feedback disabled and the means for generating the HARQ-ACK codebook comprises one of the following: mean for generating the HARQ-ACK codebook by including at least one HARQ feedback bit corresponding to the HARQ process and setting a NDI corresponding to the HARQ process to a predetermined value; or mean for generating the HARQ-ACK codebook by including the at least one HARQ feedback bit and no NDI corresponding to the HARQ process.

In some example embodiments, the plurality of HARQ processes comprises a first HARQ process with HARQ feedback enabled and a second HARQ process with HARQ feedback disabled and the means for generating the HARQ-ACK codebook comprises: means for generating the HARQ-ACK codebook by including a first HARQ feedback bit corresponding to the first HARQ process and a second HARQ feedback bit corresponding to the second HARQ process.

In some example embodiments, the second HARQ feedback bit is located after the first HARQ feedback bit.

In some example embodiments, the first and second HARQ feedback bits are ordered by HARQ process number of the first and second HARQ processes.

In some example embodiments, the HARQ-ACK codebook is a Type-3 HARQ-ACK codebook.

In some example embodiments, the means for determining respective HARQ feedback configurations of a plurality of HARQ processes comprises: means for receiving at least one SPS configuration corresponding to the plurality of HARQ processes from the network device; and means for determining the HARQ feedback configurations of the plurality of HARQ processes based on the at least one SPS configuration.

In some example embodiments, the means for determining the HARQ feedback configurations of the plurality of HARQ processes based on the at least one SPS configuration comprises means for with respect to a HARQ process comprised in the plurality of HARQ processes, in response to the at least one SPS configuration indicating a first HARQ feedback configuration for the HARQ process and a further configuration indicating a second HARQ feedback configuration for the HARQ process, determining the HARQ feedback configuration of the HARQ process as one of the following: the first HARQ feedback configuration; the second HARQ feedback configuration; a third HARQ feedback configuration indicating that HARQ feedback is enabled for the HARQ process; or a fourth HARQ feedback configuration indicating that HARQ feedback is disabled for the HARQ process.

In some example embodiments, the means for generating the HARQ-ACK codebook comprises: means for generating the HARQ-ACK codebook for SPS PDSCH based on the HARQ feedback configurations of the plurality of HARQ processes, wherein the HARQ-ACK codebook is a Type-1 HARQ-ACK codebook or Type-2 HARQ-ACK codebook.

In some example embodiments, the means for generating the HARQ-ACK codebook for SPS PDSCH comprises: means for generating HARQ feedback bits for at least one HARQ process comprised in the plurality of HARQ processes, wherein HARQ feedback is enabled for the at least one HARQ process; means for ordering the HARQ feedback bits first by their corresponding serving cell indices, second by their corresponding HARQ process number and third by their corresponding SPS PDSCH reception slot number; and means for generating the HARQ-ACK codebook comprising the ordered HARQ-ACK bits.

In some example embodiments, HARQ processes corresponding to a SPS configuration shares a same HARQ feedback configuration and the means for generating the HARQ-ACK codebook comprises: means for generating HARQ feedback bits for at least one HARQ process comprised in the plurality of HARQ processes, wherein HARQ feedback is enabled for the at least one HARQ process; means for ordering the HARQ feedback bits first by their corresponding serving cell indices, second by their corresponding SPS configuration indices and third by their corresponding SPS PDSCH reception slot number; and means for generating the HARQ-ACK codebook comprising the ordered HARQ-ACK bits.

In some example embodiments, HARQ processes corresponding to a SPS configuration have different HARQ feedback configurations and the means for generating the HARQ-ACK codebook comprises: means for generating HARQ feedback bits for at least one HARQ process comprised in the plurality of HARQ processes, wherein HARQ feedback is enabled for the at least one HARQ process; means for ordering the HARQ feedback bits first by their corresponding serving cell indices, second by their corresponding SPS configuration indices, third by their corresponding HARQ process number and fourth by their corresponding SPS PDSCH reception slot number; and means for generating the HARQ-ACK codebook comprising the ordered HARQ-ACK bits.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 comprises: means for determining, at a network device, respective HARQ feedback configurations of a plurality of HARQ processes, wherein each HARQ feedback configuration indicates whether HARQ feedback is enabled or disabled for a corresponding HARQ process; and means for receiving, from a terminal device, a HARQ-ACK codebook for Physical Downlink Shared Channel (PDSCH) generated based on the HARQ feedback configurations of the plurality of HARQ processes.

In some example embodiments, the plurality of HARQ processes comprises a HARQ process with HARQ feedback disabled; and the HARQ-ACK codebook includes no HARQ feedback bit and no NDI corresponding to the HARQ process.

In some example embodiments, the plurality of HARQ processes comprises a HARQ process with HARQ feedback disabled; the HARQ-ACK codebook includes at least one HARQ feedback bit corresponding to the second HARQ process; and a NDI corresponding to the HARQ process is set to a predetermined value in the HARQ-ACK codebook or is not included in the HARQ-ACK codebook.

In some example embodiments, the plurality of HARQ processes comprises a first HARQ process with HARQ feedback enabled and a second HARQ process with HARQ feedback disabled; and the HARQ-ACK codebook includes a first HARQ feedback bit corresponding to the first HARQ process and a second HARQ feedback bit corresponding to the second HARQ process.

In some example embodiments, the second HARQ feedback bit is located after the first HARQ feedback bit.

In some example embodiments, the first and second HARQ feedback bits are ordered by HARQ process number of the first and second HARQ processes.

In some example embodiments, the HARQ-ACK codebook is a Type-3 HARQ-ACK codebook.

In some example embodiments, the means for determining the HARQ feedback configurations of the plurality of HARQ processes comprises: means for determining the HARQ feedback configurations of the plurality of HARQ processes based on at least one SPS configuration corresponding to the plurality of HARQ processes. The apparatus further comprises means for transmitting, from the network device to the terminal device, the at least one SPS configuration.

In some example embodiments, the means for determining the HARQ feedback configurations of the plurality of HARQ processes based on the at least one SPS configuration comprises means for with respect to a HARQ process comprised in the plurality of HARQ processes, in response to the at least one SPS configuration indicating a first HARQ feedback configuration for the HARQ process and a further configuration indicating a second HARQ feedback configuration for the HARQ process, determining the HARQ feedback configuration of the HARQ process as one of the following: the first HARQ feedback configuration; the second HARQ feedback configuration; a third HARQ feedback configuration indicating that HARQ feedback is enabled for the HARQ process; or a fourth HARQ feedback configuration indicating that HARQ feedback is disabled for the HARQ process.

In some example embodiments, the means for receiving the HARQ-ACK codebook comprises: means for receiving the HARQ-ACK codebook for SPS PDSCH generated based on the HARQ feedback configurations of the plurality of HARQ processes, wherein the HARQ-ACK codebook is a Type-1 HARQ-ACK codebook or Type-2 HARQ-ACK codebook.

In some example embodiments, the HARQ-ACK codebook comprises HARQ feedback bits for at least one HARQ process comprised in the plurality of HARQ processes, HARQ feedback being enabled for the at least one HARQ process, and the HARQ feedback bits are ordered first by their corresponding serving cell indices, second by their corresponding HARQ process number and third by their corresponding SPS PDSCH reception slot number.

In some example embodiments, an apparatus capable of performing the method 900 may comprise means for performing the respective steps of the method 900. The means may be implemented in any suitable form. For example, the means may be implemented in a circuitry or software module.

In some example embodiments, the apparatus capable of performing the method 900 comprises: means for receiving, at a terminal device, DCI related to a HARQ process from a network device, wherein the DCI comprises a counter DAI field and a total DAI field, and the counter DAI field is reserved in response to HARQ feedback being disabled for the HARQ process; means for generating a HARQ-ACK codebook for PDSCH scheduled by the DCI, based on at least one of the counter DAI field and the total DAI field; and means for transmitting the HARQ-ACK codebook to the network device.

In some example embodiments, the means for generating the HARQ-ACK codebook comprises: means for in accordance with a determination that HARQ feedback is disabled for the HARQ process, generating the HARQ-ACK codebook based on the total DAI field; and means for in accordance with a determination that HARQ feedback is enabled for the HARQ process, generating the HARQ-ACK codebook based on the counter DAI field and the total DAI field.

In some example embodiments, the apparatus capable of performing the method 900 further comprises: means for in accordance with a determination that HARQ feedback is disabled for the HARQ process, determining a HARQ process number for the HARQ process at least based on the counter DAI field.

In some example embodiments, the HARQ-ACK codebook is a Type-2 HARQ-ACK codebook.

In some example embodiments, an apparatus capable of performing the method 1000 may comprise means for performing the respective steps of the method 1000. The means may be implemented in any suitable form. For example, the means may be implemented in a circuitry or software module.

In some example embodiments, the apparatus capable of performing the method 1000 comprises: means for generating, at a network device, DCI related to a HARQ process, wherein the DCI comprises a counter DAI field and a total DAI field, and the counter DAI field is reserved in response to HARQ feedback being disabled for the HARQ process; means for transmitting the DCI to a terminal device; and means for receiving a HARQ-ACK codebook for PDSCH scheduled by the DCI from the terminal device, wherein the HARQ-ACK codebook is generated based on at least one of the counter DAI field and the total DAI field.

In some example embodiments, the means for receiving the HARQ-ACK codebook comprises: means for in accordance with a determination that HARQ feedback is disabled for the HARQ process, receiving the HARQ-ACK codebook generated based on the total DAI field from the terminal device; and means for in accordance with a determination that HARQ feedback is enabled for the HARQ process, receiving the HARQ-ACK codebook generated based on the counter DAI field and the total DAI field from the terminal device.

In some example embodiments, the apparatus capable of performing the method 1000 further comprises: means for in accordance with a determination that HARQ feedback is disabled for the HARQ process, indicating a HARQ process number for the HARQ process with the counter DAI field.

In some example embodiments, the HARQ-ACK codebook is a Type-2 HARQ-ACK codebook.

In some example embodiments, an apparatus capable of performing the method 1100 may comprise means for performing the respective steps of the method 1100. The means may be implemented in any suitable form. For example, the means may be implemented in a circuitry or software module.

In some example embodiments, the apparatus capable of performing the method 1100 comprises: means for receiving, at a terminal device, DCI related to a HARQ process with HARQ feedback disabled from a network device; means for generating, for a PDSCH reception corresponding to the DCI, a HARQ feedback bit indicating a positive acknowledgement; and means for transmitting a HARQ-ACK codebook comprising the HARQ feedback bit to the network device.

In some example embodiments, the HARQ-ACK codebook is a Type-1 HARQ-ACK codebook.

In some example embodiments, an apparatus capable of performing the method 1200 may comprise means for performing the respective steps of the method 1200. The means may be implemented in any suitable form. For example, the means may be implemented in a circuitry or software module.

In some example embodiments, the apparatus capable of performing the method 1200 comprises: means for transmitting, from a network device to a terminal device, DCI related to a HARQ process with HARQ feedback disabled; and means for receiving a HARQ-ACK codebook from the terminal device, wherein the HARQ-ACK codebook comprises a HARQ feedback bit for a PDSCH reception corresponding to the DCI and the HARQ feedback bit indicates a positive acknowledgement.

In some example embodiments, the HARQ-ACK codebook is a Type-1 HARQ-ACK codebook.

Figure 13:
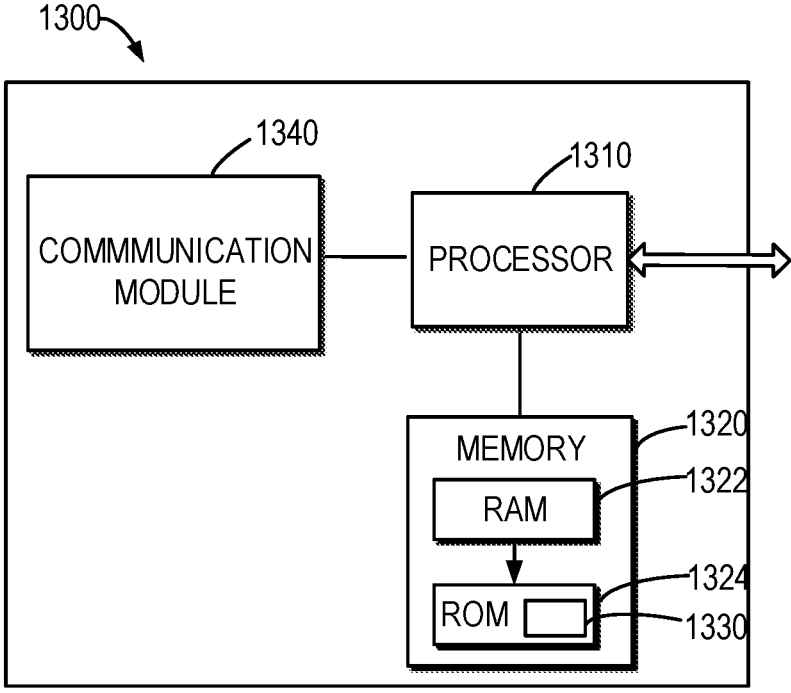
FIG. 13 illustrates a simplified block diagram of an apparatus that is suitable for implementing embodiments of the present disclosure.
Figure 14:
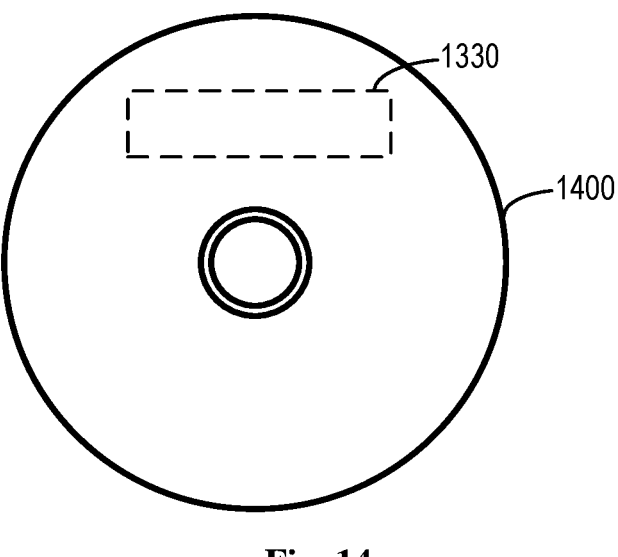
FIG. 14 illustrates a block diagram of an example computer readable medium in accordance with some example embodiments of the present disclosure.

FIG. 13 is a simplified block diagram of a device 1300 that is suitable for implementing embodiments of the present disclosure. For example, the network device 110 and/or the terminal device 120 can be implemented by the device 1300. As shown, the device 1300 includes one or more processors 1310, one or more memories 1320 coupled to the processor 1310, and one or more communication modules 1340 coupled to the processor 1310.

The communication module 1340 is for bidirectional communications. The communication module 1340 has at least one antenna to facilitate communication. The communication interface may represent any interface that is necessary for communication with other network elements.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the ROM 1324.

The processor 1310 may perform any suitable actions and processing by loading the program 1330 into the RAM 1322.

The embodiments of the present disclosure may be implemented by means of the program 1330 so that the device 1300 may perform any process of the disclosure as discussed above. The embodiments of the present disclosure may also be implemented by hardware or by a combination of software and hardware.

In some example embodiments, the program 1330 may be tangibly contained in a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any types of tangible non-volatile storage, such as ROM, EPROM, a flash memory, a hard disk, CD, DVD, and the like. FIG. 13 shows an example of the computer readable medium 1400 in form of CD or DVD. The computer readable medium has the program 1330 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 1300 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 1300 may be instead comprised in the distributed unit, and at least some of the described processes may be performed by the distributed unit.

In an embodiment, the execution of at least some of the functionalities of the apparatus 1300 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 1300 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600, 900, 1000, 1100 and/or 1200 as described above with reference to FIGS. 5, 6 and 9-12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:

determining, at a terminal device, respective hybrid automatic repeat request (HARQ) feedback configurations of a plurality of HARQ processes, wherein each HARQ feedback configuration indicates whether HARQ feedback is enabled or disabled for a corresponding HARQ process, wherein determining respective HARQ feedback configurations of a plurality of HARQ processes comprises:

receiving at least one semi-persistent scheduling (SPS) configuration corresponding to the plurality of HARQ processes from the network device; and determining the HARQ feedback configurations of the plurality of HARQ processes based on the at least one SPS configuration;

generating a hybrid automatic repeat request acknowledgement (HARQ-ACK) codebook for Physical Downlink Shared Channel (PDSCH) based on the HARQ feedback configurations of the plurality of HARQ processes, wherein generating the HARQ-ACK codebook comprises:

generating the HARQ-ACK codebook for SPS PDSCH based on the HARQ feedback configurations of the plurality of HARQ processes, wherein the HARQ-ACK codebook is a Type-1 HARQ-ACK codebook or Type-2 HARQ-ACK codebook; and transmitting the HARQ-ACK codebook to a network device.

2. The method of claim 1, wherein the plurality of HARQ processes comprises a HARQ process with HARQ feedback disabled and generating the HARQ-ACK codebook comprises:

generating the HARQ-ACK codebook by including no HARQ feedback bit and no new data indicator (NDI) corresponding to the HARQ process.

3. The method of claim 1, wherein the plurality of HARQ processes comprises a HARQ process with HARQ feedback disabled and generating the HARQ-ACK codebook comprises one of the following:

generating the HARQ-ACK codebook by including at least one HARQ feedback bit corresponding to the HARQ process and setting a NDI corresponding to the HARQ process to a predetermined value; or generating the HARQ-ACK codebook by including the at least one HARQ feedback bit and no NDI corresponding to the HARQ process.

4. The method of claim 1, wherein the plurality of HARQ processes comprises a first HARQ process with HARQ feedback enabled and a second HARQ process with HARQ feedback disabled and generating the HARQ-ACK codebook comprises:

generating the HARQ-ACK codebook by including a first HARQ feedback bit corresponding to the first HARQ process and a second HARQ feedback bit corresponding to the second HARQ process.

5. The method of claim 4, wherein the second HARQ feedback bit is located after the first HARQ feedback bit.

6. The method of claim 4, wherein the first and second HARQ feedback bits are ordered by HARQ process number of the first and second HARQ processes.

7. The method of claim 1, wherein the HARQ-ACK codebook is a Type-3 HARQ-ACK codebook.

8. The method of claim 1, wherein determining the HARQ feedback configurations of the plurality of HARQ processes based on the at least one SPS configuration comprises:

for a HARQ process comprised in the plurality of HARQ processes, in response to the at least one SPS configuration indicating a first HARQ feedback configuration for the HARQ process and a further configuration indicating a second HARQ feedback configuration for the HARQ process, determining the HARQ feedback configuration of the HARQ process as one of the following:

the first HARQ feedback configuration;

the second HARQ feedback configuration;

a third HARQ feedback configuration indicating that HARQ feedback is enabled for the HARQ process; or a fourth HARQ feedback configuration indicating that HARQ feedback is disabled for the HARQ process.

9. The method of claim 1, wherein generating the HARQ-ACK codebook for SPS PDSCH comprises:

generating HARQ feedback bits for at least one HARQ process comprised in the plurality of HARQ processes, wherein HARQ feedback is enabled for the at least one HARQ process;

ordering the HARQ feedback bits first by their corresponding serving cell indices, second by their corresponding HARQ process number and third by their corresponding SPS PDSCH reception slot number; and generating the HARQ-ACK codebook comprising the ordered HARQ-ACK bits.

10. The method of claim 1, wherein HARQ processes corresponding to a SPS configuration shares a same HARQ feedback configuration and generating the HARQ-ACK codebook comprises:

generating HARQ feedback bits for at least one HARQ process comprised in the plurality of HARQ processes, wherein HARQ feedback is enabled for the at least one HARQ process;

ordering the HARQ feedback bits first by their corresponding serving cell indices, second by their corresponding SPS configuration indices and third by their corresponding SPS PDSCH reception slot number; and generating the HARQ-ACK codebook comprising the ordered HARQ-ACK bits.

11. The method of claim 1, wherein HARQ processes corresponding to a SPS configuration have different HARQ feedback configurations and generating the HARQ-ACK codebook comprises:

generating HARQ feedback bits for at least one HARQ process comprised in the plurality of HARQ processes, wherein HARQ feedback is enabled for the at least one HARQ process;

ordering the HARQ feedback bits first by their corresponding serving cell indices, second by their corresponding SPS configuration indices, third by their corresponding HARQ process number and fourth by their corresponding SPS PDSCH reception slot number; and generating the HARQ-ACK codebook comprising the ordered HARQ-ACK bits.

12. An apparatus comprising processing circuitry coupled to a memory, the processing circuitry configured to perform operations comprising:

determining, at a terminal device, respective hybrid automatic repeat request (HARQ) feedback configurations of a plurality of HARQ processes, wherein each HARQ feedback configuration indicates whether HARQ feedback is enabled or disabled for a corresponding HARQ process, wherein determining respective HARQ feedback configurations of a plurality of HARQ processes comprises:

receiving at least one semi-persistent scheduling (SPS) configuration corresponding to the plurality of HARQ processes from the network device; and determining the HARQ feedback configurations of the plurality of HARQ processes based on the at least one SPS configuration;

generating a hybrid automatic repeat request acknowledgement (HARQ-ACK) codebook for Physical Downlink Shared Channel (PDSCH) based on the HARQ feedback configurations of the plurality of HARQ processes, wherein generating the HARQ-ACK codebook comprises:

generating the HARQ-ACK codebook for SPS PDSCH based on the HARQ feedback configurations of the plurality of HARQ processes, wherein the HARQ-ACK codebook is a Type-1 HARQ-ACK codebook or Type-2 HARQ-ACK codebook; and transmitting the HARQ-ACK codebook to a network device.

13. The apparatus of claim 12, wherein the plurality of HARQ processes comprises a HARQ process with HARQ feedback disabled and generating the HARQ-ACK codebook comprises:

generating the HARQ-ACK codebook by including no HARQ feedback bit and no new data indicator (NDI) corresponding to the HARQ process.

14. The apparatus of claim 12, wherein the plurality of HARQ processes comprises a HARQ process with HARQ feedback disabled and generating the HARQ-ACK codebook comprises one of the following:

generating the HARQ-ACK codebook by including at least one HARQ feedback bit corresponding to the HARQ process and setting a NDI corresponding to the HARQ process to a predetermined value; or generating the HARQ-ACK codebook by including the at least one HARQ feedback bit and no NDI corresponding to the HARQ process.

15. The apparatus of claim 12, wherein the plurality of HARQ processes comprises a first HARQ process with HARQ feedback enabled and a second HARQ process with HARQ feedback disabled and generating the HARQ-ACK codebook comprises:

generating the HARQ-ACK codebook by including a first HARQ feedback bit corresponding to the first HARQ process and a second HARQ feedback bit corresponding to the second HARQ process.

16. The apparatus of claim 15, wherein the second HARQ feedback bit is located after the first HARQ feedback bit.

17. The apparatus of claim 15, wherein the first and second HARQ feedback bits are ordered by HARQ process number of the first and second HARQ processes.

18. The apparatus of claim 12, wherein the HARQ-ACK codebook is a Type-3 HARQ-ACK codebook.

19. The apparatus of claim 12, wherein determining the HARQ feedback configurations of the plurality of HARQ processes based on the at least one SPS configuration comprises:

for a HARQ process comprised in the plurality of HARQ processes, in response to the at least one SPS configuration indicating a first HARQ feedback configuration for the HARQ process and a further configuration indicating a second HARQ feedback configuration for the HARQ process, determining the HARQ feedback configuration of the HARQ process as one of the following:

the first HARQ feedback configuration;

the second HARQ feedback configuration;

a third HARQ feedback configuration indicating that HARQ feedback is enabled for the HARQ process; or a fourth HARQ feedback configuration indicating that HARQ feedback is disabled for the HARQ process.

20. The apparatus of claim 12, wherein generating the HARQ-ACK codebook for SPS PDSCH comprises:

generating HARQ feedback bits for at least one HARQ process comprised in the plurality of HARQ processes, wherein HARQ feedback is enabled for the at least one HARQ process;

ordering the HARQ feedback bits first by their corresponding serving cell indices, second by their corresponding HARQ process number and third by their corresponding SPS PDSCH reception slot number; and generating the HARQ-ACK codebook comprising the ordered HARQ-ACK bits.

\* \* \* \* \*